E. C. HORST.
STEM PICKER.
APPLICATION FILED JAN. 28, 1920.

1,348,139.

Patented July 27, 1920.

INVENTOR
E. Clemens Horst.

BY Strong & Townsend
ATTORNEYS

UNITED STATES PATENT OFFICE.

EMIL CLEMENS HORST, OF SAN FRANCISCO, CALIFORNIA.

STEM-PICKER.

1,348,139.  Specification of Letters Patent.  Patented July 27, 1920.

Application filed January 28, 1920. Serial No. 354,725.

*To all whom it may concern:*

Be it known that I, EMIL CLEMENS HORST, a citizen of the United States, residing at the city and county of San Francisco and State of California, have invented new and useful Improvements in Stem-Pickers, of which the following is a specification.

This invention relates to a stem picker and especially to a machine for separating stems from hops and the like.

Picking of hops by machinery is resorted to at the present time in several of the larger hop growing districts and is becoming more and more a necessity due to the scarcity of labor and troubles connected therewith. Hops picked in this manner contain a considerable quantity of leaves and stems and other foreign matter, the major portion of which are removed by separators of various types. It happens however that while the leaves are comparatively easily removed that there still remains a considerable quantity of stems and it is the purpose of the present invention to provide a machine which is particularly adapted for removing the stems.

The invention briefly stated involves a longitudinally extending inclined draper belt from the surface of which projects a series of pins. The hops, from which it is desired to remove the stems, are delivered to one end of this draper belt and will, during the travel of said belt, tend to roll off the belt and to a conveyer which removes them from the stem picking machine, stems and other similar material being hung up on the pins and later removed as will hereinafter be described.

The invention also involves a mechanism for maintaining the draper in a state of continuous vibration thereby insuring a perfect removal of the hops deposited thereon while in no way impairing the action of the stem separating mechanism.

The invention further consists of the parts and the construction, combination and arrangement of parts as hereinafter fully described and claimed, having reference to the accompanying drawings, in which—

Figure 1:
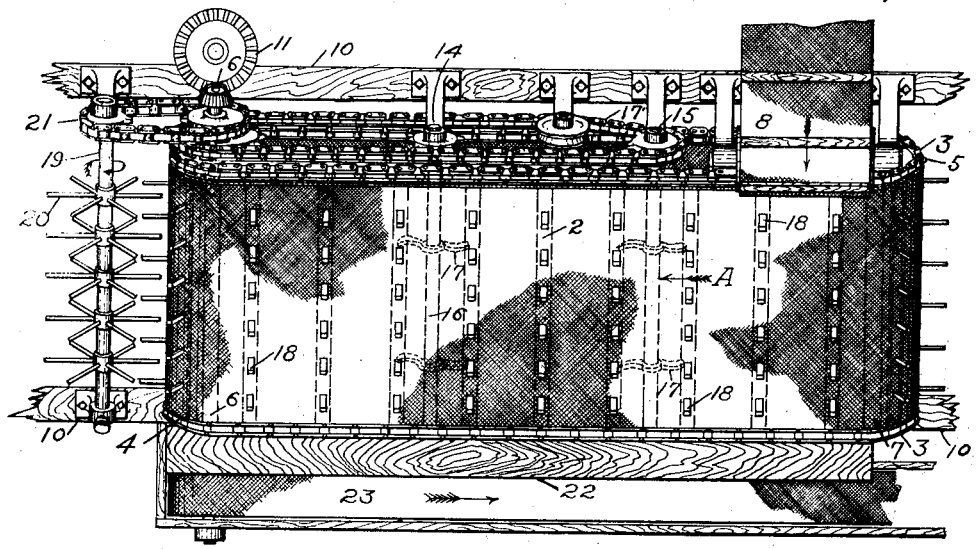
Figure 1 is a plan view of the stem picking machine.
Figure 2:
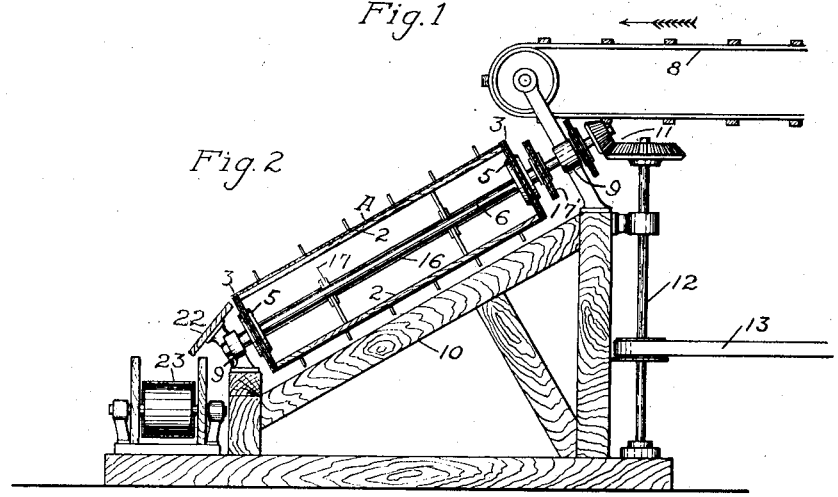
Fig. 2 is a cross sectional end view.
Figure 3:
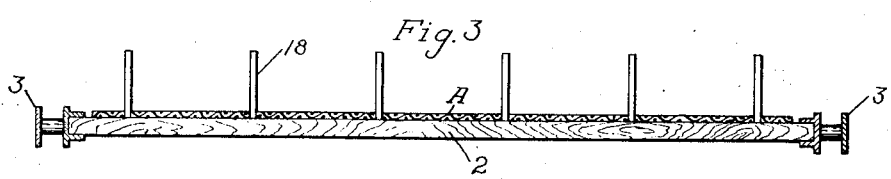
Fig. 3 is a detail view of the chains and one of the slats by which the draper belt is supported.
Figure 4:
Fig. 4 is an end view of one of the beaters whereby vibratory movement is transmitted to the draper belt.

Referring to the drawings in detail, A indicates an endless draper belt constructed of suitable material such as canvas and the like. This belt is secured to a series of slats 2, which in turn are secured to a pair of endless sprocket chains 3 carried by sprockets 4 and 5 secured on respective shafts indicated at 6 and 7. The draper belt when driven travels in the direction of arrow A (see Fig. 1) and is so supported as to present a comparatively steep inclined surface throughout its length upon which the hops to be separated are delivered by means of a conveyer or other suitable means indicated at 8. The shafts 6 and 7 supporting the sprockets 4 and 5, the endless sprocket chains 3 and the draper belt A, are supported in journals 9 which in turn are secured or carried by a main frame 10. Power is transmitted to the shaft 6 by means of a beveled gear train 11 which in turn is driven by means of a vertically disposed shaft 12 and a pulley 13. Also supported by the main frame 10 are alined bearing members 14 and 15, and journaled in each pair of bearing members are shafts 16 upon which are secured beater arms 17. The shafts 16 are revolved at a comparatively high speed and will therefore cause the ends of the beater arms 17 to engage the slats 2 supporting the draper belt and thereby impart a vibratory movement which is very essential as will hereinafter be described; the shafts 16 being driven by means of a chain 17' from shaft 6 or any other suitable means.

Secured to each cross slat 2 are a series of upwardly projecting pins 18. These pins are provided for the purpose of catching the stems contained in the hops inasmuch as they form obstructions upon which the stems are caught when deposited on the draper A. The pins are preferably spike like in formation and they will therefore not form any material obstruction to the free escape of the hops. Journaled at the opposite end of the draper A is a shaft 19 upon which is secured a series of fingers 20. The shaft 19 is also driven from the shaft 6 as shown at 21 by means of a chain or the like and will during its revolution serve as a comb or cleaner whereby the stems hung up or caught by the pins 18 are removed, that is, the projecting arms 20 secured on shaft 19 will during the revolution of the shaft 19 pass between the pins 18 as they reach the end of the draper and they will therefore serve as the fingers of a comb or cleaner which continuously removes the stems as they accumulate.

The operation of the machine will be as follows:

The hops to be cleaned are delivered to the draper A by means of a conveyer 8, continuous movement of the draper A and vibration imparted thereto by means of the beater arms 17 will cause the hops to roll downwardly over the surface of the draper during its travel in the direction of arrow (A). They will find comparatively little resistance to a free discharge in this direction as the pins are spike-like and rounded and will therefore permit the hops to roll freely between the same. In fact all hops will have escaped from the draper before the opposite end is reached. The hops in rolling off the draper A are received by a chute or deflecting plate 22 which delivers them to a conveyer 23, this conveyer removing the cleaned hops as they discharge and conveying them to any point desired. Stems or other similar objectionable material will naturally hang up on the pins and will be automatically removed when the opposite end is reached due to the action of the comb or revolving cleaner 20. The draper will therefore always present a clean surface at the point where the hops are delivered and the capacity and the efficiency of the same should therefore be comparatively great.

The machine here shown is exceedingly simple and substantial in construction, is entirely automatic in operation when once started as no adjustment or attention of any nature is required due to the simplicity of the mechanism and the automatic operation of the same.

While certain structural features are here more or less specifically illustrated, I wish it understood that various changes in shape, proportions and the design may be resorted to within the scope of the appended claims, similarly that the materials and finish of the several parts employed may be such as the experience and judgment of the manufacturer may dictate or various conditions may demand.

Having thus described my invention what I claim and desire to secure by Letters Patent is—

1. An apparatus for separating hops from associated leaves and stems, said apparatus including a woven close surfaced endless belt, transverse slats upon which the belt is fixed, a sprocket chain on either side by which the slats and belt are supported and moved in the direction of its greatest length, sprocket gears at each end of the sprocket chain, shafts supporting said sprocket wheels, said shafts being inclined laterally with relation to the travel of the belt to permit the belt to assume an inclined lateral position, pins projecting upwardly from the slats through the belt surface to entangle and carry leaves and stems along with the belt while allowing the hops to roll down the transverse incline between the pins and to discharge from the lower edge of the belt.

2. A stem picking machine comprising a comparatively long endless draper belt, said belt being laterally inclined with relation to its path of travel, means for delivering the material to be separated to one end of the belt, and means on the belt for obstructing the passage of stems.

3. A stem picking machine comprising a comparatively long endless draper belt, said belt being laterally inclined with relation to its path of travel, means for transmitting a continuous travel movement to the belt, means for imparting a vibratory movement to the belt while traveling, means for delivering the material to be separated to one end of the belt, and means on the belt for obstructing the passage of the stems.

4. A stem picking machine comprising a comparatively long endless draper belt, said belt being laterally inclined with relation to its path of travel, means for transmitting a continuous travel movement to the belt, means for imparting a vibratory movement to the belt while traveling, means for delivering the material to be separated to one end of the belt, means on the belt for obstructing the passage of the stems, and means at one end of the belt for removing the stems.

5. A stem picking machine comprising a comparatively long endless draper belt, said belt being laterally inclined with relation to its path of travel, means for transmitting a continuous traveling movement to the belt, beater arms engageable with the underside of the belt to transmit a vibratory movement thereto, a series of pins projecting from the surface of the belt, means for delivering hops to the belt and means at one end of the belt for removing stems and like material caught by the pins during the passage of hops over the surface of the belt.

6. A stem picking machine comprising a comparatively long endless draper belt, said belt being laterally inclined with relation to its path of travel, slats extending crosswise of the belt, a sprocket chain on each side of the belt to which the slats are secured, sprockets supporting the chains and driving the draper belt, pins projecting from the slats through the surface of the belt, means for delivering hops to one end of the belt, said hops adapted to travel laterally across the belt when delivered thereto, due to the inclined position of the belt, means for transmitting a vibratory movement to the draper belt to assist the lateral travel of the hops across the belt, and means for automatically removing hop stems hung up on the projecting pins.

7. A stem picking machine comprising a comparatively long endless draper belt, said belt being laterally inclined with relation to its path of travel, slats extending crosswise of the belt, a sprocket chain on each side of the belt to which the slats are secured, sprockets supporting the chains and driving the draper belt, pins projecting from the slats through the surface of the belt, means for delivering hops to one end of the belt, said hops adapted to travel laterally across the belt when delivered thereto, due to the inclined position of the belt, means for transmitting a vibratory movement to the draper belt to assist the lateral travel of the hops across the belt, and means for automatically removing hop stems hung up on the projecting pins, said means comprising a shaft disposed at one end of the draper belt and fingers on said shaft adapted to pass between the pins on the draper belt and thereby remove hop stems caught or hung up on the pins.

8. A stem picking machine comprising a comparatively long endless draper belt, said belt being laterally inclined with relation to its path of travel, slats extending crosswise of the belt, a sprocket chain on each side of the belt to which the slats are secured, sprockets supporting the chains and driving the draper belt, pins projecting from the slats through the surface of the belt, means for delivering hops to one end of the belt, said hops adapted to travel laterally across the belt when delivered thereto, due to the inclined position of the belt, beater arms engageable with the slats adapted to transmit a vibratory movement to the draper belt to assist the lateral travel of the hops across the belt, means for automatically removing hop stems hung up on the projecting pins, said means comprising a shaft disposed at one end of the draper belt and fingers on said shaft adapted to pass between the pins on the draper belt and thereby remove hop stems caught or hung up on the pins, means for removing the hops after the stems have been separated therefrom, and means for driving the stem cleaning shaft in unison with the draper belt.

9. In a hop and leaf separating apparatus of the character described, an endless traveling belt fixed to transverse slats which have pins projecting above the belt surface, sprocket chains and sprocket shafts journaled at a comparatively steep incline transverse to the line of travel of the belt, said sprocket chains supporting the slats and belt to cause this to assume an inclined position transversely with relation to its direction of travel, transverse shafts journaled below the belt surface, beater arms secured on the shafts, and means for revolving the shafts to cause the beater arms to strike the belt slats and thereby transmit a vibratory movement to the belt.

10. In a hop and leaf separating apparatus of the character described, an endless traveling belt fixed upon transverse slats, pins secured on said slats and projecting through the belt surface, sprocket wheels and chains to which the slats are secured and by which the belt is moved, said sprocket wheels and shafts being disposed on a comparatively steep incline to cause the belt to assume a steep inclined position laterally with relation to the direction of travel, means engageable with the slats supporting the belt adapted to transmit a vibratory movement thereto and means at one end of the belt for automatically removing leaves and stems adhering to the pins.

In testimony whereof I have hereunto set my hand in the presence of two subscribing witnesses.

EMIL CLEMENS HORST.

Witnesses:
JOHN H. HERRING,
W. W. HEALEY.